Nov. 17, 1953 M. CAMRAS 2,659,541

DRIVE MECHANISM FOR MAGNETIC RECORDERS

Filed Dec. 31, 1946 3 Sheets-Sheet 1

INVENTOR.

MARVIN CAMRAS.

BY

The Firm of Charles H. Hill

Attys.

Nov. 17, 1953 M. CAMRAS 2,659,541

DRIVE MECHANISM FOR MAGNETIC RECORDERS

Filed Dec. 31, 1946 3 Sheets-Sheet 2

INVENTOR.
MARVIN CAMRAS.
BY The Firm of Charles W. Hills
Attys.

INVENTOR.
MARVIN CAMRAS
BY
[signature]
Attys.

Patented Nov. 17, 1953 2,659,541

UNITED STATES PATENT OFFICE 2,659,541

DRIVE MECHANISM FOR MAGNETIC RECORDERS

Marvin Camras, Chicago, Ill., assignor to Armour Research Foundation of Illinois Institute of Technology, Chicago, Ill., a corporation of Illinois Application December 31, 1946, Serial No. 719,383

4 Claims. (Cl. 242—54)

This invention relates to a magnetic recorder, and more particularly to the drive mechanism of a magnetic recorder.

In magnetic recorders, an elongated magnetic record member is moved over an electromagnetic transducer head at substantially a uniform rate of speed. It is important in all magnetic recorders to provide an efficient yet simple method of handling the elongated record member, and to this end, most magnetic recorders include a supply spool from which the record member is unwound and a take-up spool on which the record member is wound up. The electromagnetic transducer head is interposed between the two spools and the record member is caused to pass thereover or therethrough.

Magnetic recorders may be generally classified as spool-drive recorders or as capstan-drive recorders. These two terms are used rather broadly to refer to drive mechanisms in which the take-up spool is driven at a constant angular velocity and in which an intermediate drive mechanism is provided for causing the record member to travel at a uniform linear velocity across the transducer head, respectively.

While it is well recognized that capstan drives are more satisfactory from the standpoint of quality of recording and reproduction, they have nevertheless not been used as widely as have spool drives because of the usually considered greater complexity of a capstan drive type of system.

One of the principal features and objects of the present invention is to provide a novel drive mechanism for a magnetic recorder of the capstan type.

It should be pointed out that as the expression "magnetic recorder" is used throughout, it refers to a device which either magnetically records or magnetically reproduces or does both.

A further object of the present invention is to provide a novel drive mechanism for moving an elongated magnetic record member at substantially constant linear velocity.

Another object of the present invention is to provide novel tensioning means in the drive mechanism of a magnetic recorder.

A still further object of the present invention is to provide novel brake mechanism in a magnetic recorder.

Another and further object of the present invention is to provide novel winding and reeling mechanism for elongated members.

The novel features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawings, in which:

Figure 1:
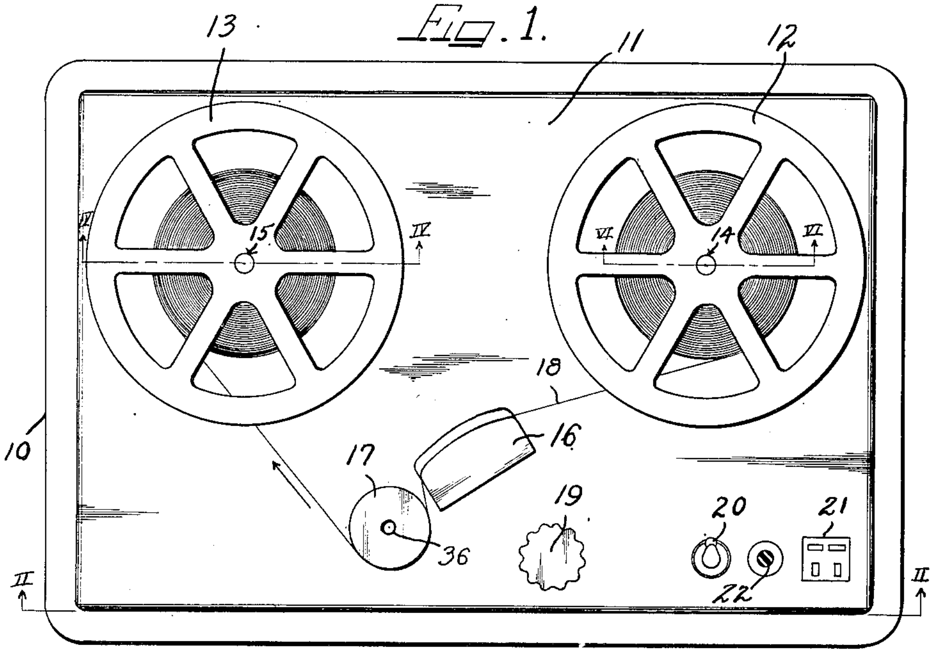
Figure 1 is a plan view of a magnetic recorder embodying the novel teachings of the present invention.
Figure 3:
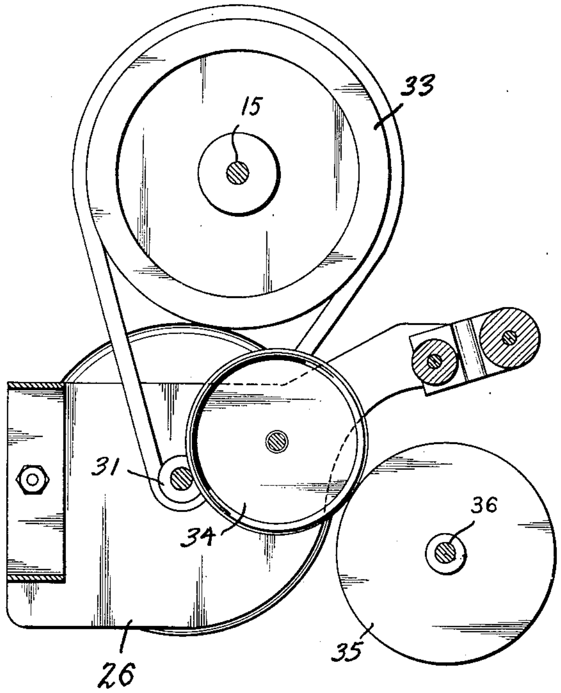
Figure 3 is a fragmentary view of the intermediate drive rolls as viewed along the line III—III of Figure 2.

As shown in Figure 1 of the drawings, the magnetic recorder includes a case or housing 10 having a top panel 11 upon which a supply spool 12 and a take-up spool 13 are arranged to be mounted on spindles 14 and 15, respectively. Also mounted on the panel 11 is an electromagnetic transducer head 16 adjacent a capstan roller 17, the latter being arranged to be driven at a uniform angular velocity in a manner presently to be described in order to impart uniform linear velocity to the elongated record member 18 which is being unwound from the supply spool 12 and wound up on the take-up spool 13.

Also located on the panel 11 is a volume control knob 19 including an on-off switch for the audio amplifier, a toggle switch 20 for turning the motor on and off and a microphone and high frequency jack 21. The power supply cord 22 is also arranged to enter the unit through the top panel 11, so that the entire device may be removed as a unit from the housing 10.

The present invention is directed to a novel drive mechanism, and one embodiment of such a drive mechanism is illustrated in detail in Figures 2 to 6 of the drawings.

In Figure 1, the general outer appearance of the illustrated embodiment of the present invention has been shown.

Figure 2:
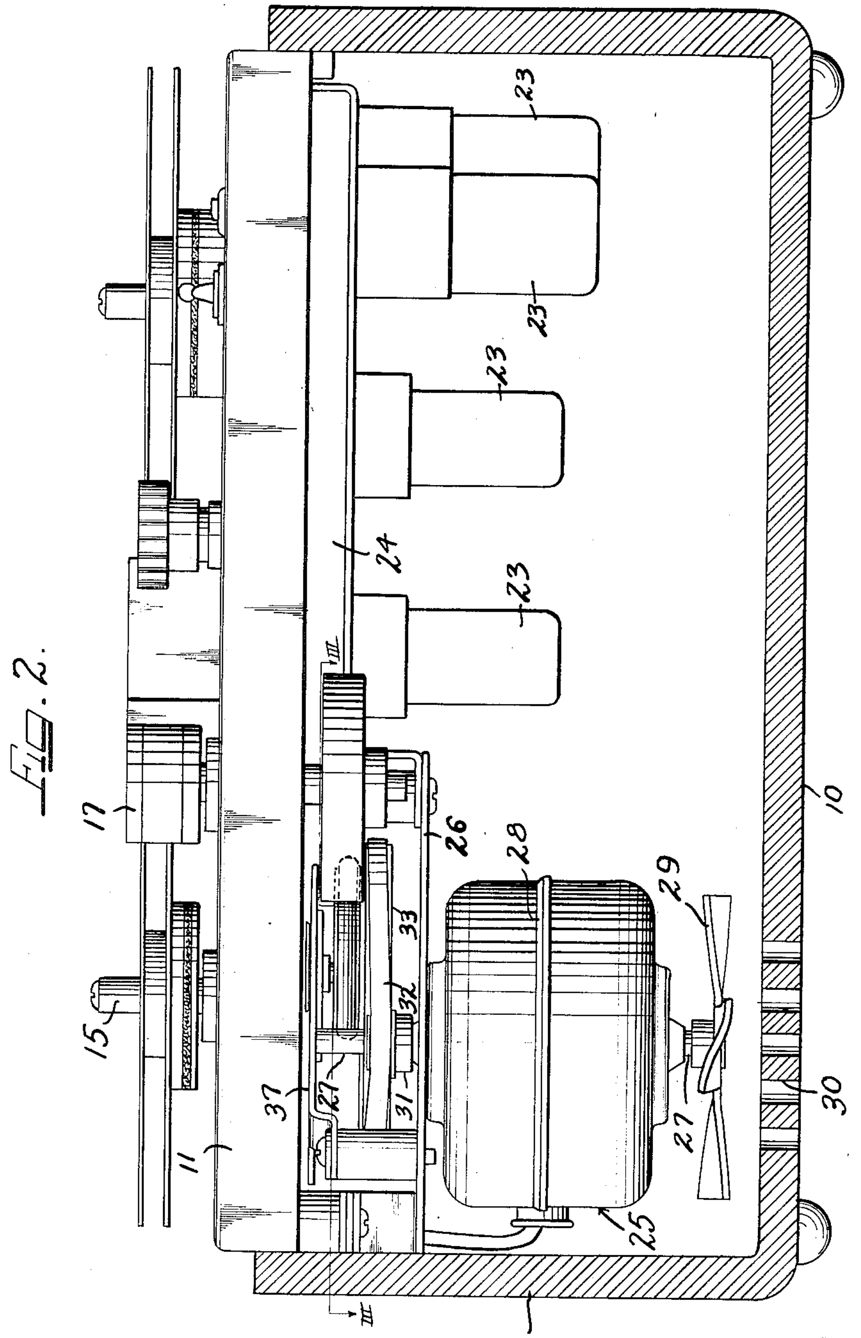
Figure 2 is a vertical sectional view as taken along the line II—II of Figure 1.

Turning now to Figure 2, it will be seen that a great part of the operating mechanism of the device is mounted below the panel 11. For purposes of simplicity of illustration, the loud speaker has been removed in order not to conceal the amplifier and part of the drive mechanism, but it is to be understood that it is mounted in the front of the housing 10 to the right of the motor and in front of the amplifier tubes 23. The audio amplifier has not been illustrated in detail, since any form of audio amplifier may be employed but it will be understood that the audio amplifier is represented diagrammatically by the tubes 23 as mounted on the sub-chassis 24.

On the left side of the housing 10 is located a motor 25 which is arranged to drive the take-up spindle 15 and the capstan 17. The motor 25 is supported from a suitable bracket 26. The motor 25 has a double-ended armature shaft 27 which projects both above and below the housing 28 of the motor 25. A fan 29 is mounted on the lower end of the armature shaft 27 and suitable apertures 30 are provided in the bottom wall of the casing 10 for permitting air to be drawn in through the casing and circulated throughout the interior of the housing.

The upper end of the armature shaft is provided with a drive pulley 31 which is connected through a flexible endless belt 32 to a relatively large pulley 33 mounted on the spindle 15. This causes rotation of the spool 13 in a clockwise direction as viewed in Figure 1 when the motor is driven in a clockwise direction (the assumed direction of rotation of the motor in the illustrated embodiment of the invention).

The armature shaft 27 projects upwardly beyond the drive pulley 31 and in this upper region is engaged by a rubber tired intermediate drive roller 34, the latter being in turn engaged by the metal drive wheel 35 which is mounted on the capstan drive shaft 36 carrying the capstan 17.

The drive wheel 35 is preferably given sufficient mass so that in addition to acting as a drive roller, it also acts as a fly-wheel to stabilize the rotary motion of the capstan when the machine is in operation.

The intermediate rubber tired drive roller 34 is mounted on the upper bracket portion 37.

Figure 4:
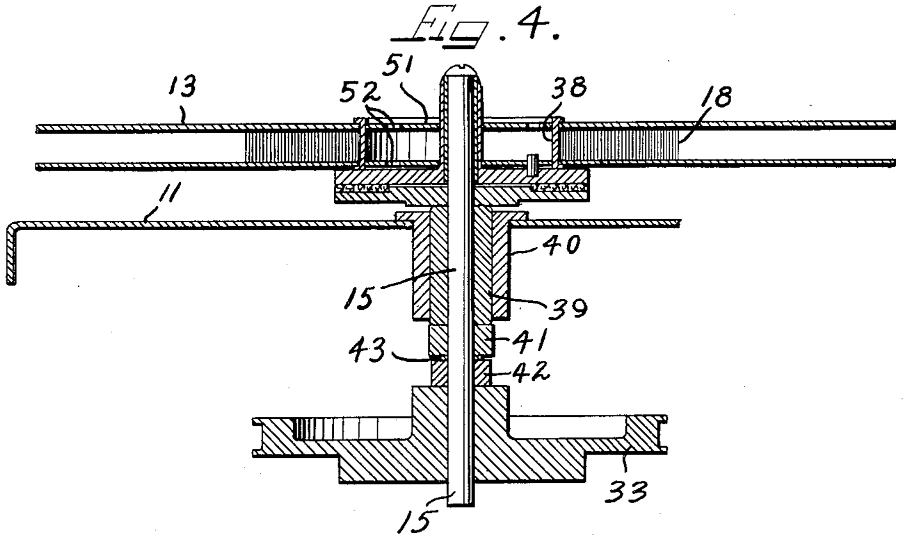
Figure 4 is a fragmentary vertical sectional view through the take-up spool and its associated spindle mounting mechanism as taken along the line IV—IV of Figure 1.
Figures 5, 6:
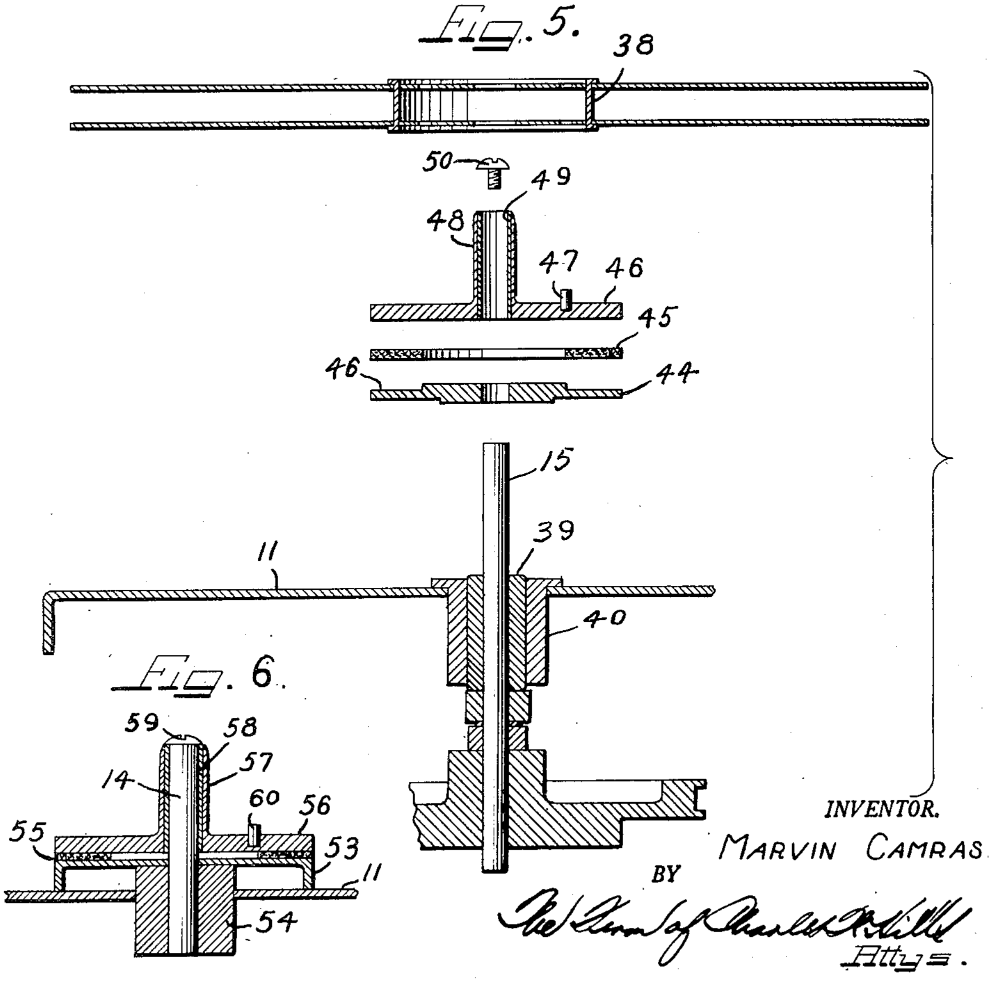
Figure 5 is an exploded view of the take-up spool drive mechanism which is shown in assembled position in Figure 4.
Figure 6 is a fragmentary vertical sectional view of the brake and spindle of the supply spool as taken along the line VI—VI of Figure 1.

The ratio relationship of the size of the drive pulley 31 to the large pulley 33 is such that the take-up spool or reel 13 always tries to drive the record member 18 faster than the capstan 17 even for the first layer of the record member on the drum 38 of the take-up spool (see Figures 4 and 5). The drive mechanism is so arranged, however, that there is no slippage between the record member 18 and the capstan 17, but the slipping clutch is provided for the drive to the spool 13, and a slipping brake is provided for the spool 12 as will now be described.

Referring now to Figures 4 and 5 of the drawings, the spindle 15, upon which the large drive pulley 33 is mounted at the lower end, projects up through a sleeve bearing 39 which is carried in a bearing housing 40 mounted on the panel 11. Spacer rings 41 and 42, spaced apart by a small washer 43, separate the drive pulley 33 from the bearing housing 40 and the bearing 39.

A clutch plate 44 carrying a brake ring 45 is secured to the spindle 15 in any suitable manner, such as by means of a press fit. The upper surface of the clutch member 44 is provided with a marginal shoulder portion 46 in which the brake ring 45 is seated. A second clutch member 46 having a lock pin 47 for the spool 13 is provided with a hub portion 48 and an inner sleeve 49 which is arranged to slip over the upper end of the spindle 15 and be retained in place by means of a bolt 50 which is arranged to be threaded into the upper end of the spindle 15.

In assembled position, the various elements of this drive mechanism appear as shown in Figure 4 of the drawings. The spool or reel 13 is arranged to drop down and be supported on the upper clutch member 46. This spool or reel 13 has a central portion 51 which is provided with openings 52 therein. One of these openings is arranged to engage and receive the lock pin 47 on the clutch member 46, so as to prevent relative rotation between the upper clutch member 46 and the spool 13.

The weight of the spool 13 causes sufficient biasing pressure to be exerted against the brake ring 45 carried on the lower clutch member 44 so that a driving connection is made therebetween. It will be noted that as the weight of the spool increases due to the winding up of a record member 18 thereon, the friction between the upper and lower clutch members increases. This is desirable, however, as will be apparent to those skilled in the art in order to maintain substantially uniform tension on the record member 18 over the capstan 17.

This operational feature of the present invention will presently be discussed in greater detail in connection with the description of the operation of this device.

It is also desirable to provide a braking action on the supply spool 12 in order to hold the record member 18 tight on the recording and reproducing head 16 and in good driving engagement with the capstan 17. The illustrated embodiment of the present invention, as is shown in Figure 6 of the drawings, includes a lower brake member 53 which is supported on the panel 11 and on a hub 54 which extends through the panel 11.

A brake ring 55 of any suitable braking material is also provided. The upper brake member 56 is similar to the upper clutch member 46 of the take-up spool drive mechanism, and includes a hub portion 57 having a sleeve 58 therein through which the stub shaft 14 extends. The upper end of the stub shaft or spindle 14 is provided with a bolt 59 to removably secure the upper brake member 56 in place. The supply spool 12 is supported on the upper brake member 56, and in order to prevent relative rotation between the supply spool 12 and this upper brake member 56, a lock pin 60 is provided similar to the lock pin 47 of the take-up spool drive mechanism.

It will be understood from the above description that the lower brake member 53 remains stationary and is secured to the panel 11, while the upper brake member 56 rotates with the supply spool 12 and is partialy braked in its rotative movement by the frictional drag between the upper brake member 56 and the brake ring 55 carried on the lower brake member 53. It will also be observed from the above description that there is an automatically varying torque on the supply reel, for the braking torque decreases due to the decreasing weight of the supply spool as the record member is unwound.

It will further be observed when full consideration is given to the problem that as the take-up spool fills up it becomes heavier, and its torque increases, but the tension (i. e., the pulling force) remains approximately the same. This also applies to the supply spool. If the tensioning force produced on the record member 18 by the take-up spool 13 is substantially equal to the tensioning force put on the record member 18 by the supply spool 12, substantially no driving force is required at the capstan, and hence there will be no tendency to slip even though the co-efficient of friction between the capstan and the record member 18 is low.

It will furthermore be appreciated that if the tensioning force placed on the record member 18 by the supply spool 12 and the take-up spool 13 are equal, but high, there will be more friction against the capstan. If there never was to be an unbalance between the two tensioning forces, there would be no necessity to have high tensioning forces. However, if there is an unbalance between these two tensioning forces, it is desirable to have a higher tensioning force placed on the record member 18 by the two spools, so that there will be no slippage at the capstan. The amount of tension which is desirable is governed by the maximum unbalance likely to occur and also by the co-efficient of friction between the capstan 17 and the record member 18.

One of the greatest advantages of the present invention is that if the drive reel stops or slows down, the tape does not pile up for the capstan just slips. This is a distinct advantage over using a capstan with a drive roller positively driving the record member.

In operating the magnetic recorder of the present invention, the volume control, on-off amplifier switch 19, is turned on, and the motor switch 20 is also thrown. This causes energization of the motor 25 which rotates the take-up spool 13 in a clockwise direction through the belt drive 32. Energization of the motor 25 also causes rotation of the capstan 17 in a clockwise direction. As the record member 18, which in this instance has been illustrated as a magnetic tape, is wound up on the take-up spool 13, it is unwound from the supply spool 12. Due to the fact that the belt drive 32 tends to drive the take-up 13 faster than the speed transmitted to the tape 18 from the capstan 17, there is a slight slippage between the clutch members 44 and 46. There is also a slippage between the brake members 53 and 56 and for that reason, the record member 18 is tensioned across the capstan 17 and over the electromagnetic transducer head 16.

After the record member 18 has been completely unwound from the supply spool 12 and wound up on the take-up spool 13, the two spools are interchanged and the spool 13 which was the take-up spool is now mounted on the supply spool spindle 14.

The head 16 is so constructed that its operative portion engages half of the width of the record member 18 only. It will thus be understood that the first time the record member 18 is moved across the head 16, half of the record is played back.

After the two spools are interchanged and turned upside down, the other half of the record member 18 is in operative engagement with the electromagnetic transducer head 16. In this second operation, the spool 12 which was originally the supply spool, now becomes the take-up spool, and the spool 13 which was originally the take-up spool is now the supply spool. After the record has been played back so as to reproduce the other half of the width of the record, the record is in its original condition. It will thus be apparent that no rewinding is necessary with this arrangement.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A magnetic recorder comprising an idler supply spool and a take-up spool, an elongated record member on said supply spool and extending to said take-up spool, a slipping friction clutch, means for driving said take-up spool through said friction clutch, an annular friction brake member coaxial with said supply spool for braking said supply spool at a varying braking torque, a drive roller over and partially around which said record member extends, means for driving said drive roller at substantially constant speed, means for driving said take-up spool through said friction clutch at a speed tending to take up said record member at a faster speed than said drive roller imparts to said record member, said brake being proportioned with respect to said friction clutch to produce a tensioning force on said record member substantially equal and opposite to the tension force produced by said drive means through said slipping friction clutch, whereby said drive roller alone determines the speed of travel of said record member.

2. A magnetic recorder comprising an idler supply spool and a take-up spool, an elongated record member on said supply spool and extending to said take-up spool, a slipping friction clutch, means for driving said take-up spool through said friction clutch, an annular friction brake coaxial with said supply spool for braking said supply spool at a varying braking torque, a drive roller over and partially around which said record member extends, said drive roller having a relatively high co-efficient of friction with respect to said record member, means for driving said drive roller at substantially constant speed, means for driving said take-up spool through said friction clutch at a speed tending to take up said record member at a faster speed than said drive roller imparts to said record member, said brake being proportioned with respect to said friction clutch to produce a tensioning force on said record member substantially equal and opposite to the tension force produced by said drive means through said slipping friction clutch, whereby said drive roller alone determines the speed of travel of said record member.

3. A magnetic recorder comprising an idler supply reel and a take-up reel, an elongated record member on said supply reel and extending to and arranged to be wound up on said take-up reel, a slipping friction clutch, means for driving said take-up reel through said friction clutch, automatically varying torque brake means coaxial with said supply reel for braking said supply reel, said brake means being proportioned with respect to said friction clutch to produce a tensioning force on said record member substantially equal and opposite to the tension force produced by said drive means through said friction clutch, a drive roller over and partially around which said record member extends, means for driving said drive roller at substantially constant speed, means for driving said take-up reel through said friction clutch at a speed tending to take up said record member at a faster speed than said driver roller imparts to said record member, the torque of said brake means being automatically reduced as the take-off point approaches the center of rotation of said supply reel thereby to maintain a substantially constant tensioning force on said record member.

4. A magnetic recorder capstan drive mechanism for an elongated record medium, comprising a gravity actuated slipping clutch including a take-up spool supporting member and a subjacent driving member, a gravity actuated slipping brake including a supply spool supporting member and a subjacent stationary braking member, said brake and said clutch having substantially equal slippage resisting characteristics for uniformly tensioning the record medium, a single capstan offset from said clutch and said brake to receive the record member partially therearound and having a smooth driving surface over which the record medium may slip, and ratio drive means in driving connection with said clutch driving member and said capstan to produce slippage of said clutch while the record medium is taken up from said capstan, thereby to tension said record member substantially equally and oppositely across the smooth driving surface of said capstan during operation of the mechanism.

MARVIN CAMRAS.

References Cited in the file of this patent

UNITED STATES PATENTS

| Number | Name | Date |
|---|---|---|
| 1,240,560 | Gilmore | Sept. 18, 1917 |
| 1,398,680 | Clayton | Nov. 29, 1921 |
| 1,640,760 | Emery | Aug. 30, 1927 |
| 1,789,607 | Steurer | Jan. 20, 1931 |
| 1,798,904 | Schneider | Mar. 31, 1931 |
| 2,179,334 | Keyes | Nov. 7, 1939 |
| 2,215,468 | Herzig | Sept. 24, 1940 |
| 2,372,810 | Camras | Apr. 3, 1945 |